(12) United States Patent
Popp et al.

(10) Patent No.: US 8,162,796 B2
(45) Date of Patent: Apr. 24, 2012

(54) METHOD FOR OPERATING AN AUTOMATIC GEARBOX

(75) Inventors: Christian Popp, Kressbonn (DE); Klaus Steinhauser, Kressbronn (DE); Peter Schiele, Kressbronn (DE); Bernd Allgaier, Kressbronn (DE); Thilo Schmidt, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 880 days.

(21) Appl. No.: 12/225,620

(22) PCT Filed: Feb. 27, 2007

(86) PCT No.: PCT/EP2007/051834
§ 371 (c)(1),
(2), (4) Date: Sep. 26, 2008

(87) PCT Pub. No.: WO2007/113059
PCT Pub. Date: Oct. 11, 2007

(65) Prior Publication Data
US 2009/0176612 A1 Jul. 9, 2009

(30) Foreign Application Priority Data
Mar. 31, 2006 (DE) .......................... 10 2006 014 947

(51) Int. Cl.
*B60W 10/02* (2006.01)
(52) U.S. Cl. ........................................................ 477/77
(58) Field of Classification Search ................... 477/77
See application file for complete search history.

(56) References Cited

U.S. PATENT DOCUMENTS

| | | |
|---|---|---|
| 5,106,352 A | 4/1992 | Le Pelletier |
| 5,134,903 A | 8/1992 | Itoh |
| 5,361,651 A | 11/1994 | Wakahara |
| 5,460,581 A | 10/1995 | Ueda |
| 5,827,153 A | 10/1998 | Yasue et al. |
| 5,913,748 A | 6/1999 | Takiguchi |
| 5,924,957 A | 7/1999 | Yasue et al. |
| 6,183,393 B1 | 2/2001 | Habeck |
| 6,375,597 B1 | 4/2002 | Popp et al. |
| 7,029,413 B2 | 4/2006 | Sugawara et al. |
| 7,134,538 B2 | 11/2006 | Hasegawa et al. |
| 2002/0072447 A1* | 6/2002 | Genise ............................ 477/77 |
| 2004/0053734 A1 | 3/2004 | Raghavan et al. |
| 2004/0087410 A1 | 5/2004 | Usoro et al. |
| 2004/0132576 A1 | 7/2004 | Usoro et al. |
| 2006/0046892 A1 | 3/2006 | Bucknor et al. |

FOREIGN PATENT DOCUMENTS

| | | |
|---|---|---|
| DE | 41 21 774 A1 | 1/1992 |
| DE | 43 34 172 A1 | 4/1994 |
| DE | 690 10 472 A1 | 3/1995 |
| DE | 196 49 442 A1 | 6/1997 |
| DE | 197 22 480 A1 | 12/1997 |
| DE | 197 25 513 A1 | 12/1998 |

(Continued)

*Primary Examiner* — Edwin A Young
(74) *Attorney, Agent, or Firm* — Davis & Bujold, P.L.L.C.

(57) ABSTRACT

A method for operating an automatic transmission of a motor vehicle, in particular a variable-speed automatic transmission. The automatic transmission has five shift elements and for transferring torque or force in a forward gear and in a reverse gear at least three of the five shift elements are engaged. In a neutral position of the automatic transmission, to prevent torque or force flow at least one of the shift elements that are engaged in the respective forward or reverse gear is fully disengaged.

9 Claims, 1 Drawing Sheet

| | FOREIGN PATENT DOCUMENTS | |
|---|---|---|
| DE | 197 50 447 A11 | 6/1999 |
| DE | 100 43 510 A1 | 3/2002 |
| DE | 103 20 775 A1 | 12/2004 |
| DE | 10 2004 035 504 A1 | 2/2005 |
| DE | 10 2004 040 613 A1 | 3/2006 |
| DE | 10 2004 040 642 A1 | 3/2006 |
| DE | 10 2005 005 617 A1 | 3/2006 |
| EP | 0 564 016 A2 | 10/1993 |
| EP | 0 736 706 A2 | 10/1996 |
| EP | 1 416 194 A2 | 5/2004 |
| EP | 1 502 804 A2 | 2/2005 |
| FR | 2 855 583 | 12/2004 |
| WO | WO-2006/017905 A1 | 2/2006 |

* cited by examiner

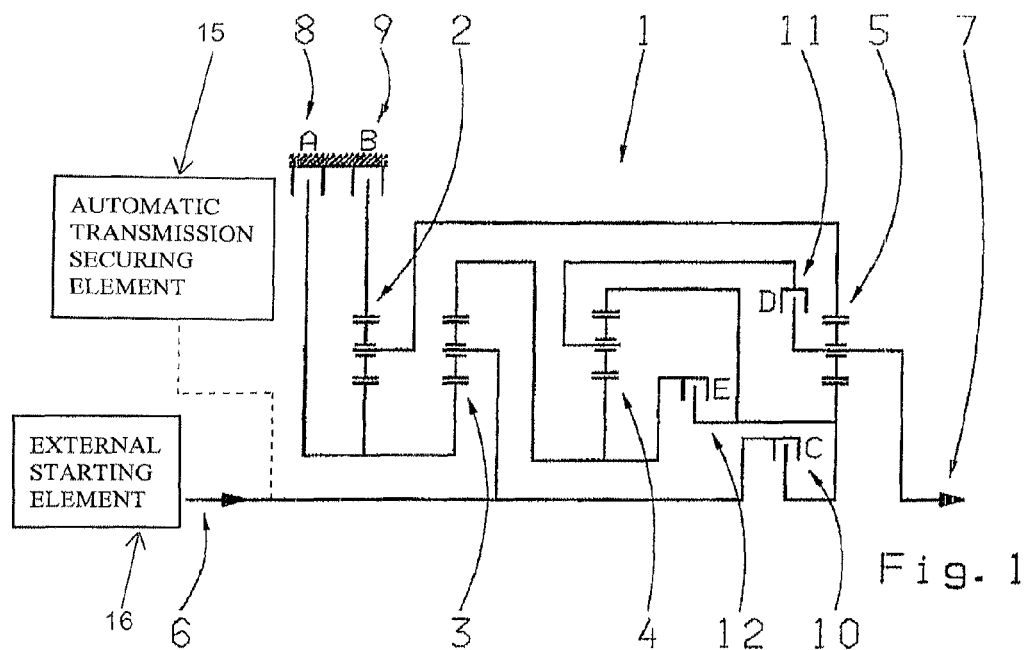

METHOD FOR OPERATING AN AUTOMATIC GEARBOX

This application is a national stage completion of PCT/EP2007/051834 filed Feb. 27, 2007, which claims priority from German Application Ser. No. 10 2006 014 947.5 filed Mar. 31, 2006.

FIELD OF THE INVENTION

The invention concerns a method for operating an automatic transmission.

BACKGROUND OF THE INVENTION

Vehicles need transmissions in order to transform torques and speeds. The task of a vehicle transmission is to convert the traction force potential of a drive engine. The present invention concerns a method for operating an automatic transmission. In the context of this invention the term automatic transmission should be understood to mean any transmission with an automatic gear change, also known as an automatic variable-speed transmission.

In the development of automatic transmissions a continual trend can be observed toward increasing the number of gears, particularly the forward gears of an automatic transmission. Thus, at present automatic transmissions with eight forward gears are being developed, such automatic transmissions with eight forward gears having at least five shift elements, at least three of these at least five shift elements in such an automatic transmission being engaged for torque transfer and force transfer in any forward gear and in a reverse gear. If such an automatic transmission is in the neutral position, then it must be ensured that while in the neutral position no torque or force transfer can take place, since otherwise a motor vehicle with such an automatic transmission could start moving inadvertently. Until now, however, no methods for operating such automatic transmissions have been known which ensure that the automatic transmission is comprehensively secured in the neutral position.

Against this background, the present invention addresses the problem of providing a new type of method for operating an automatic transmission.

SUMMARY OF THE INVENTION

With regard to a first aspect of the present invention that problem is solved by a method for operating an automatic transmission herein. According to this, in a neutral position of the automatic transmission, to guard against any undesired torque or force transfer at least one of the shift elements that are engaged in the respective forward or reverse gear is completely disengaged.

With regard to a second aspect of the present invention, the problem is solved by the method for operating an automatic transmission herein. According to this, in a neutral position of the automatic transmission, to guard against any undesired torque or force transmission all the shift elements that are engaged in the respective forward or reverse gear are engaged, but a further shift element present in the drive train, which can also be located within the transmission unit, is completely disengaged.

BRIEF DESCRIPTION OF THE DRAWINGS

The invention will now be described, by way of example, with reference to the accompanying drawings in which:

FIG. 1 is a transmission layout of an automatic transmission with five shift elements, in which the method according to the invention can be used advantageously, and FIG. 2 is a shift element matrix for the shift elements of the transmission layout in FIG. 1, to clarify which shift elements are engaged in which gear.

DETAILED DESCRIPTION OF THE INVENTION

The present invention concerns a method for operating an automatic transmission.

FIG. 1 shows a transmission layout 1 of a variable-speed transmission in which the method for operating an automatic transmission is preferably used. The automatic transmission of FIG. 1 has a total of four transmission gearsets 2, 3, 4 and 5 designed to convert a transmission input torque applied to a transmission input 6 into a transmission output torque at a transmission output 7. The transmission gearsets 2, 3,4 and 5 of the automatic transmission in FIG. 1 are made as planetary transmission gearsets.

As shown in the transmission layout 1 of FIG. 1, besides the four transmission gearsets 2 to 5, the automatic transmission also comprises a total of five shift elements 8, 9, 10,11 and 12. The shift element 8 also is denoted as shift element A; shift element 9 denoted as shift element B; shift element 10 denoted as shift element C; shift element 11 denoted as shift element D, and shift element 12 denoted as shift element E. The shift elements A and B are both brakes whereas the shift elements C, D and E are all clutches. The shift elements 8 to 12 are shift elements of the transmission gearset system.

In the automatic transmission represented schematically in FIG. 1, comprising the five shift elements 8 to 12, application of a shift matrix 14. shown in FIG. 2, can produce eight forward gears and one reverse gear. The eight forward gears "1" to "8" and the reverse gear "R" are entered down the left-hand column of the shift matrix 14, and the shift elements A to E along the top row of shift matrix 14. Shift elements marked with a spot in the shift element matrix 14 are engaged in the respective gear. It can be seen that in each case three of the five shift elements are engaged for each forward gear and for the reverse gear.

For example, the shift elements A, B and C for are engaged for forward gear "1" and shift elements A, B and D are engaged for the reverse gear "R". In contrast, in the respective gears the other shift elements are fully disengaged.

Thus, for the transfer of force or torque from the transmission input 6 to the transmission output 7 in the automatic transmission shown in FIG. 1, in each gear three shift elements are completely engaged while in contrast two shift elements are completely disengaged.

The present invention now provides a method for operating an automatic transmission of this type in order to prevent undesired force or torque transfer when in a neutral position.

According to a first embodiment of the present invention, in a neutral position of the automatic transmission, to guard against any undesired torque or force transfer at least one of the shift elements that are engaged in the respective forward or reverse gear is completely disengaged. This can be done in the following four alternative ways.

According to a first alternative of the first embodiment of the present invention, to secure the automatic transmission in the neutral position, shown by $N_1$ in FIG. 2, all three of the shift elements that are engaged in the respective forward or reverse gear are completely disengaged in the neutral position.

This first alternative of the first embodiment of the present invention is used above all when, in the neutral position, value is placed on security against multiple errors when a hydraulic holding function, for example the onset of emergency running, would lead to the engagement of a drive position, or when this is, made necessary for reasons to do with transmission mechanics, because of an internal speed situation.

In the example embodiment illustrated, the first alternative of the first embodiment of the present invention is applied when, starting from forward gear "6", the automatic transmission has been shifted to the neutral position.

According to a second alternative of the first embodiment of the present invention, a single possible example of this embodiment shown as $N_2$ in FIG. 2, to secure the automatic transmission in the neutral position, two of the three shift elements that are engaged in the respective forward or reverse gear are completely disengaged in the neutral position, but a third one of the three shift elements engaged in the forward or reverse gear is engaged in the neutral position.

According to a third alternative of the first embodiment of the present invention, a single possible example of this embodiment shown as $N_3$ in FIG. 2, to secure the automatic transmission in the neutral position a first one of the shift elements that are engaged in the respective forward or reverse gear is completely disengaged in the neutral position, a second one of the shift elements engaged in the forward or reverse gear is partially filled in the neutral position so that no or almost no torque is transferred by the second shift element, but a third one of the shift elements engaged in the forward or reverse gear is engaged in the neutral position. In the partially filled condition of a shift element an air gap thereof is bridged.

This second alternative of the first embodiment of the present invention for gear engagement is preferably used when, in the neutral position, security against simple errors must be ensured while, at the same time, the reaction time in the subsequent gear arrangement is sufficient.

In the example embodiment illustrated, the second alternative of the first aspect of the present invention is used when, before the gear engagement, starting from forward gears "3" or "4" or "5" or "7" or "8" in the neutral position.

According to a third alternative of the first embodiment of the present invention, to secure the automatic transmission in the neutral position, a first one of the shift elements that are engaged in respective forward or reverse gear is completely disengaged in the neutral position, a second one of the shift elements engaged in the forward or reverse gear is partially filled in the neutral position so that no or almost no torque is transferred by the second shift element, but a third one of the shift elements engaged in the forward or reverse gear is engaged in the neutral position. In the partially filled condition of a shift element, an air gap thereof is bridged.

A third alternative of the first aspect of the present invention is preferably used when, in the neutral position, sufficient security against simple errors must be ensured, which at least means that the vehicle cannot roll along and, at the same time, there must be a good reaction time for a subsequent gear engagement.

In the example embodiment illustrated, the third alternative of the first aspect of the present invention is used when, starting from forward gears "1" or "2" or from the reverse gear "R", the automatic transmission has been shifted to the neutral position.

The above three alternatives of the first embodiment of the present invention all provide sufficient security of an automatic transmission in the neutral position against any undesired force or torque transmission and, as explained above, are used in combination with one another for operating an automatic transmission depending on the gears from which the automatic transmission has been shifted to the neutral position.

Thus, in the neutral position from which as a matter of course, a gear is engaged, that alternative (the third alternative) is chosen which gives the best reaction time. For the other gears in which, as a matter of course, a gear engagement is only carried out during driving, the alternative (the second alternative) is chosen which places the greater weight on safety, since the reaction time is then not so critical.

If there are hydraulic reasons or ones related to transmission mechanics which do not allow a shift element to be kept engaged, then the first alternative is chosen.

According to a fourth alternative of the first embodiment of the present invention, to secure the automatic transmission in the neutral position, two of the three shift elements that are engaged in the respective forward or reverse gear are engaged in the neutral position, but a third one of the three shift elements engaged in the forward or reverse gear is completely disengaged.

When this fourth alternative of the first embodiment of the invention is to be used, at least one further measure for securing the automatic transmission, such as an automatic transmission securing element 15, must be activated. The automatic transmission securing element 15 may be, for example, any one of an engine speed limitation, an application of the vehicle's parking brake and/or an accelerator pedal actuation restriction. Alternatively to or in combination with the above measures, as a further measure to provide additional securing of the automatic transmission, the drive output speed can be monitored in combination with monitoring of the vehicle's inclination.

According to a second embodiment of the present invention, to secure an automatic transmission in the neutral position against any undesired torque or force flow, all three of the shift elements that are engaged in a respective forward or reverse gear are also engaged in the neutral position, so that this second embodiment of the invention can only be used with an automatic transmission in which torque or force transfer in the forward or reverse gear can be influenced by a further shift element present in the drive train, where the further shift element can also be located within the transmission unit.

This further shift element can be an external starting element 16. For example in parallel hybrid systems in which an electric motor and a combustion engine act upon an automatic transmission, such external starting elements 16 are positioned upstream from the automatic transmission. The alternatives of the first aspect of the invention for controlling the shift elements in the neutral position can be combined with this second embodiment for controlling the further shift element in accordance with the second embodiment of the invention.

Although with reference to FIGS. 1 and 2, the invention has been described for the preferred application case of an automatic transmission with five shift elements, three of which at a time are engaged in any forward gear and in a reverse gear, it should be made clear at this point that the invention can also be used with automatic transmissions having a larger number of shift elements, and certainly also when a larger number of shift elements are engaged in any gear. In such cases, the number of open or partially filled shift elements is adapted to the systems in question and the additional shift elements are kept engaged so that, compared with the method described above, only the number of engaged shift elements is different.

Finally, let it be said that the shift elements A to E or 8 to 12, controlled in accordance with the first embodiment of the invention, can also be referred to as shift elements internal to the transmission or internal to the transmission gearset system, whereas the further shift element in the drive train, which is relevant for the second embodiment of the invention, can be referred to as the shift element external to the transmission or external to the transmission gearset system.

Reference Numerals
1 transmission layout
2 transmission gearset
3 transmission gearset
4 transmission gearset
5 transmission gearset
6 transmission input
7 transmission output
8 shift element A
9 shift element B
10 shift element C
11 shift element D
12 shift element E
14 shift element matrix

The invention claimed is:

1. A method of operating an automatic transmission of a motor vehicle, the automatic transmission having at least five shift elements, at least three of which are engaged to transfer one of torque or force in any forward gear and reverse gear, and in a neutral position of the automatic transmission, at least one of the three shift elements that are engaged in the forward or the reverse gear is completely disengaged to prevent undesired transfer of one of torque or force flow, the method comprising the steps of:
completely disengaging when the automatic transmission is in the neutral position, a first one of the three shift elements that are engaged in the forward or the reverse gear;
partially filling a second one of the three shift elements that are engaged in the forward or the reverse gear such that the second one of the three shift elements essentially transfers no torque; and
engaging a third one of the three shift elements that are engaged in the forward or the reverse gear.

2. The method according to claim 1, further comprising the step of providing the automatic transmission with exactly five shift elements, three of which are engaged to transfer one of torque or force in any forward gear and reverse gear.

3. A method of operating an automatic transmission of a motor vehicle, the automatic transmission has exactly five shift elements, three of which are engaged to transfer one of torque or force in any forward gear and reverse gear, and in a neutral position of the automatic transmission, at least one of the three shift elements that are engaged in the forward or the reverse gear is completely disengaged to prevent undesired transfer of one of torque or force flow, the method comprising the steps of:
completely disengaging two of the three shift elements and engaging a third of the three shift elements in the neutral position of the automatic transmission.

4. A method of operating an automatic transmission of a motor vehicle, the automatic transmission has at least five shift elements, at least three of which are engaged to transfer one of torque or force in any forward gear and reverse gear, and in a neutral position of the automatic transmission, at least one of the three shift elements that are engaged in the forward or the reverse gear is completely disengaged to prevent undesired transfer of one of torque or force flow, the method comprising the steps of:
completely disengaging all of the at least five shift elements when the automatic transmission is in the neutral position.

5. The method according to claim 4, further comprising the step of providing the automatic transmission with exactly five shift elements, three of which are engaged to transfer one of torque or force in any forward gear and reverse gear.

6. A method of operating an automatic transmission of a motor vehicle, the automatic transmission has exactly five shift elements, three of which are engaged to transfer one of torque or force in any forward gear and reverse gear, and, in a neutral position of the automatic transmission, at least one of the three shift elements that are engaged in the forward or the reverse gear is completely disengaged to prevent undesired transfer of one of torque or force flow, the method comprising the steps of:
engaging two of the at least three shift elements that are engaged in the respective forward or the reverse gear in the neutral position of the automatic transmission, and completely disengaging the third one of the at least three shift elements that are engaged in the forward gear or the reverse gear to prevent undesired transfer of one of torque or force flow.

7. The method according to claim 6, further comprising the step of securing the automatic transmission by activating at least one of a motor speed limiting means, a vehicle parking brake, and an accelerator pedal actuation restricting means.

8. A method of operating an automatic transmission of a motor vehicle, the automatic transmission has at least five shift elements, at least three of which are engaged to transfer one of torque or force in any forward gear and reverse gear, and a starting element is associated with the automatic transmission, located in a drive train in a position one of upstream and downstream from the automatic transmission, and is engaged to transfer one of torque or force in the forward gear and the reverse gear, the method comprising the step of:
preventing undesired torque or force flow with the automatic transmission in a neutral position and all the shift elements that are engaged in the respective forward or the reverse gear being engaged by fully disengaging the starting element.

9. The method according to claim 8, further comprising the step of providing the automatic transmission with exactly five shift elements, three of which are engaged for transferring torque or force in any of the forward gears or the reverse gear.

* * * * *